US012801644B2

(12) United States Patent
Luo et al.

(10) Patent No.: US 12,801,644 B2
(45) Date of Patent: Nov. 17, 2026

(54) SEARCH PROMPT METHOD, DEVICE, AND MEDIUM

(71) Applicant: HANGZHOU ALIBABA INTERNATIONAL INTERNET INDUSTRY CO., LTD., Hangzhou City (CN)

(72) Inventors: Zhaohui Luo, Hangzhou City (CN); Linbo Jin, Hangzhou City (CN); Sen Liu, Hangzhou City (CN)

(73) Assignee: HANGZHOU ALIBABA INTERNATIONAL INTERNET INDUSTRY CO., LTD., Hangzhou City (CN)

( * ) Notice: Subject to any disclaimer, the term of this patent is extended or adjusted under 35 U.S.C. 154(b) by 180 days.

(21) Appl. No.: 18/606,139

(22) Filed: Mar. 15, 2024

(65) Prior Publication Data

US 2024/0311408 A1 Sep. 19, 2024

(51) Int. Cl.
*G06F 16/3332* (2025.01)
*G06F 40/40* (2020.01)

(52) U.S. Cl.
CPC .......... *G06F 16/3337* (2019.01); *G06F 40/40* (2020.01)

(58) Field of Classification Search
CPC .... G06F 16/3337; G06F 40/40; G06F 40/263; G06F 40/274; G06F 16/9532; G06F 16/953
USPC .......... 704/2
See application file for complete search history.

(56) References Cited

U.S. PATENT DOCUMENTS

| | | | | |
|---|---|---|---|---|
| 7,653,623 B2 * | 1/2010 | Kashima | G06F 16/951 | 707/715 |
| 8,484,218 B2 * | 7/2013 | Raghunath | G06F 16/3337 | 707/769 |
| 8,874,541 B1 * | 10/2014 | Vandehey | G06F 16/951 | 707/726 |

(Continued)

FOREIGN PATENT DOCUMENTS

| | | |
|---|---|---|
| CN | 103927375 A | 7/2014 |
| CN | 108846037 A | 11/2018 |

(Continued)

OTHER PUBLICATIONS

Extended European Search Report in EP Application No. 24163720, dated Jul. 4, 2024, 6 pgs.

*Primary Examiner* — Thierry L Pham
(74) *Attorney, Agent, or Firm* — Armstrong Teasdale LLP

(57) ABSTRACT

A search prompt method, a device and a medium are provided. The method comprises: receiving search information in a first language; performing matching based on the search information in the first language, determining a plurality of search keywords in the first language; determining a plurality of search keywords in a target language respectively corresponding to the plurality of search keywords in the first language, performing sorting based on the plurality of search keywords in the target language, and screening the plurality of search keywords in the target language; determining search keywords, as predictive search keywords, in the first language corresponding to search keywords in the target language that have been screened out; and feeding back the predictive search keywords to perform search prompt in a search box.

14 Claims, 5 Drawing Sheets

(56) References Cited

U.S. PATENT DOCUMENTS

| | | | | |
|---|---|---|---|---|
| 2012/0330919 | A1* | 12/2012 | Chen | G06F 16/3322<br>707/706 |
| 2017/0011031 | A1 | 1/2017 | Tashiro | |
| 2022/0207104 | A1* | 6/2022 | Shang | G06F 16/9538 |

FOREIGN PATENT DOCUMENTS

| | | | |
|---|---|---|---|
| CN | 115718821 | A | 2/2023 |
| WO | 2012037726 | A1 | 3/2012 |

* cited by examiner

SEARCH PROMPT METHOD, DEVICE, AND MEDIUM

CROSS-REFERENCE TO RELATED APPLICATIONS

This application claims priority to Chinese patent application, No. 202310273185.2, entitled "SEARCH PROMPT METHOD, DEVICE, AND MEDIUM", filed with the Chinese Patent Office on Mar. 17, 2023, which is hereby incorporated by reference in its entirety.

TECHNICAL FIELD

The present application relates to the field of computer technology, and in particular to a search prompt method, an electronic device, and a storage medium.

BACKGROUND

Cross-border e-commerce websites provide cross-border e-commerce services, and users may purchase commodity objects from different countries on cross-border e-commerce websites. Since cross-border e-commerce websites support the sale of commodity objects between different countries, they also support languages of different countries.

When a user searches on a website, a page may usually perform prediction based on the user's input, thereby providing keywords for the user to choose, so that a search can be conducted in a faster and more accurate manner. However, when searching on a cross-border e-commerce website, since this website supports multiple languages, and user behavior is sparse under some languages, it is difficult to match keywords, which renders prompted keywords inaccurate, and will even affect the accuracy and efficiency of subsequent searches.

SUMMARY

An embodiment of the present application provides a search prompt method to improve the accuracy of search keywords.

Correspondingly, embodiments of the present application further provide a search prompt method, an electronic device, and a storage medium to ensure implementation and application of the above system.

In order to solve the above problem, an embodiment of the present application discloses a search prompt method, comprising:

- receiving search information in a first language;
- performing matching based on the search information in the first language, determining a plurality of search keywords in the first language;
- determining a plurality of search keywords in a target language respectively corresponding to the plurality of search keywords in the first language, performing sorting based on the plurality of search keywords in the target language, and screening the plurality of search keywords in the target language;
- determining search keywords, as predictive search keywords, in the first language corresponding to search keywords in the target language that have been screened out; and
- feeding back the predictive search keywords to perform search prompt in a search box.

Optionally, the performing matching based on the search information in the first language, determining a plurality of search keywords in the first language comprises:

- querying first index information by using the search information in the first language as a prefix, determining at least one search keyword in the first language, wherein the first index information is created by using prefixes as indexes; and
- matching, based on the search information in the first language, historical search data, determining at least one search keyword in the first language.

Optionally, the method further comprises: matching the search keywords in the first language corresponding to the search information in other ways, on condition that the number of the search keywords in the first language is less than a set threshold.

Optionally, the matching the search keywords in the first language corresponding to the search information in other ways comprises at least one of the following:

- segmenting the search information, employing a corresponding segmentation result to match second index information, determining at least one search keyword in the first language, wherein the second index information is created by using segmented words as indexes;
- extracting a stem of text in the search information, matching the first index information and/or the second index information based on the stem, determining at least one search keyword in the first language;
- performing error correction detection for the search information, revising search information with an error, employing the revised search information to perform matching, determining at least one search keyword in the first language; and
- performing semantic analysis for the search information, determining at least one search keyword in the first language which is semantically matched.

Optionally, the determining the plurality of search keywords in the target language respectively corresponding to the plurality of search keywords in the first language comprises:

- determining whether the first language is the target language;
- on condition that the first language is the target language, using the search keywords in the first language as the search keywords in the target language; and
- on condition that the first language is not the target language, querying the search keywords in the target language corresponding to the search keywords in the first language.

Optionally, the performing sorting based on the plurality of search keywords in the target language comprises:

- inputting the plurality of search keywords in the target language into a sorting module, determining a sorting score corresponding to each search keyword; and
- sorting the search keywords in the target language according to the sorting scores.

Optionally, the inputting the plurality of search keywords in the target language into a sorting module, determining a sorting score corresponding to each search keyword comprises:

- acquiring a historical search keyword sequence and feature parameters of a user, wherein the feature parameters include: user features, keyword features and deviation parameters;

inputting the plurality of search keywords in the target language, the historical search keyword sequence and the feature parameters into the sorting module for processing; and outputting the sorting score corresponding to each search keyword.

An embodiment of the present application further discloses a search prompt method, comprising:

displaying a search page, wherein the search page comprises a search control;

receiving, in response to triggering the search control, a character input by a user, and adding the character into search information in a first language, wherein the search information in the first language comprises at least one character;

sending the search information in the first language to perform matching at a server side based on the search information in the first language, determining a plurality of search keywords in the first language; determining a plurality of search keywords in a target language respectively corresponding to the plurality of search keywords in the first language; performing sorting based on the plurality of search keywords in the target language; screening the plurality of search keywords in the target language; determining search keywords in the first language corresponding to the search keywords in the target language that are screened out, using the determined search keyword in the first language as predictive search keywords; and generating prediction results; and receiving and displaying the prediction results to prompt the user with the predictive search keywords corresponding to the search information.

An embodiment of the present application further discloses a search prompt method, comprising:

providing a search page, wherein the search page comprises a search control;

receiving search information in a first language, wherein the search information in the first language is determined by a character as received, the character is received in response to triggering the search control, and the search information in the first language comprises at least one character;

performing matching based on the search information in the first language, determining a plurality of search keywords in the first language;

determining a plurality of search keywords in a target language respectively corresponding to the plurality of search keywords in the first language, performing sorting based on the plurality of search keywords in the target language, and screening the plurality of search keywords in the target language;

determining search keywords, as predictive search keywords, in the first language corresponding to search keywords in the target language that have been screened out; and generating prediction results based on the predictive search keywords, and feeding back the prediction results to a client side to prompt a user with the predictive search keywords corresponding to the search information.

An embodiment of the present application further discloses an electronic device, comprising: a processor; and a memory with executable codes stored therein, wherein the executable codes, when executed by the processor, execute the method described in the embodiments of the present application.

An embodiment of the present application further discloses one or more machine-readable media with executable codes stored therein, wherein the executable codes, when executed by a processor, execute the method described in the embodiments of the present application.

Compared with the prior art, the embodiments of the present application provide the following advantages.

In the embodiments of the present application, search information in a first language is received and matched, a plurality of search keywords in the first language are determined, then a search keyword in a target language corresponding to each of the search keywords in the first language is determined, sorting is performed based on a plurality of search keywords in the target language, the search keywords in the target language are screened. Other target languages may be introduced to sort the keywords in the first language to improve the accuracy of sorting. Search keywords in the first language corresponding to the search keywords in the target language that are screened out are determined and used as predictive search keywords, and feedback on the predictive search keywords is provided to perform search prompt in a search box, such that search keywords can be matched and accurately sorted even for a language with scarce behavior, the accuracy of the keywords is improved, and the efficiency of user search and input is improved.

DETAILED DESCRIPTION

In order to enable the above purposes, features, and advantages of the present application to be more obvious and lucid, further detailed explanations of the present application will be provided below with reference to the drawings and specific implementations.

Embodiments of the present application may be applied to search scenarios, such as cross-border e-commerce search scenarios. When a user inputs search information on a website to search, search keywords that the user may need may be predicted based on the already input content, thereby providing the keywords for the user to select, which, in one aspect, can improve the input efficiency of search information, and in another aspect, can provide more accurate keywords to improve the efficiency of subsequent searches.

However, for some languages in which shopping behavior is limited on the website, it is difficult to match accurate keywords, which will affect the input efficiency and accuracy of search information and also affect the efficiency of subsequent searches.

An embodiment of the present application provides a search prompt method that can match search keywords in the same language based on search information already input by a user, and then combine with other target languages to perform keyword sorting and scoring. The target languages may be a language with more search relevant data such as behavior data and commodity object data, which can provide a richer data foundation and improve the accuracy of sorting. Then, a search keyword may be screened out for providing a prompt.

Figure 1:
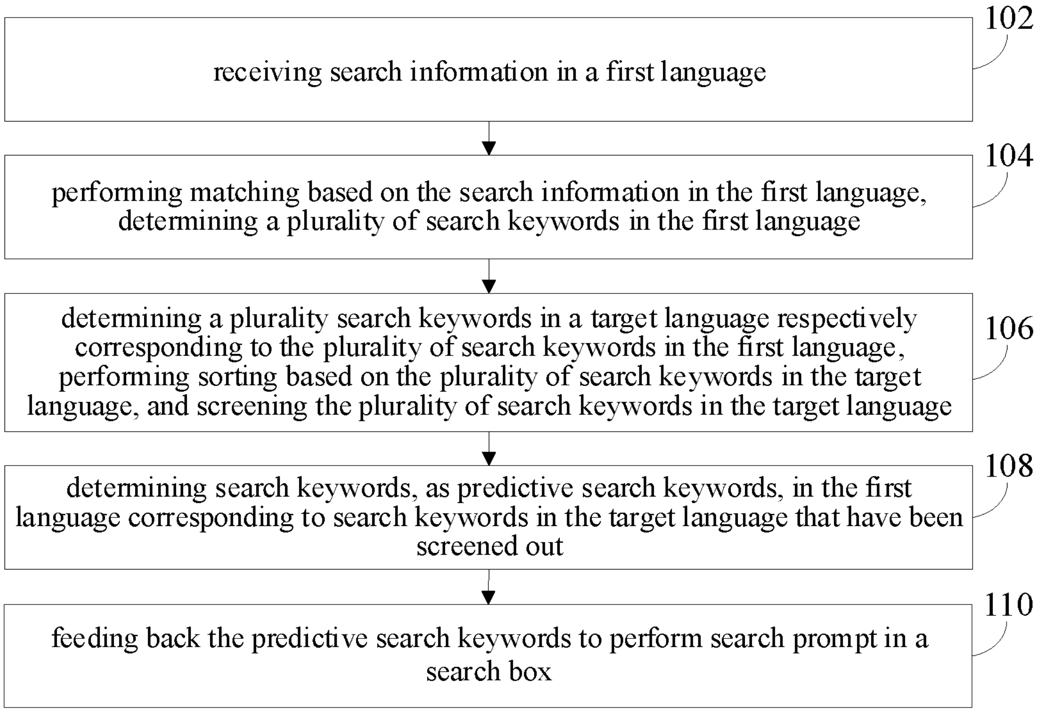
FIG. 1 is a flow chart of steps of an embodiment of a search prompt method in the present application.

Referring to FIG. 1, there is shown a flow chart of steps of an embodiment of a search prompt method in the present application.

At Step 102, receiving search information in a first language.

A user who desires to search for a commodity object on a page of a cross-border e-commerce website may input search information in a search box. In a process of user inputting, the search information already input by the user may be acquired and uploaded to a server side.

A language used by the user to input the search information serves as a first language, such as Chinese, English, Japanese, French, Spanish, Arabic, or the like. The search information in the first language may be directly uploaded.

At Step 104, performing matching based on the search information in the first language, determining a plurality of search keywords in the first language.

Based on this search information in the first language, matching may be performed to determine search keywords that can be predicted. This search information may be employed to match database tables, index information, or the like to determine a plurality of search keywords in the first language.

In some scenarios, a search related index table may be created in advance. Various search keywords and their relevant information may be acquired, and classified by language, so as to determine search keywords corresponding to each language. The relevant information of a search keyword is information related to the search keyword, such as a display location of the search keyword, the number of searches for the search keyword, and the number of clicks, etc. A corresponding key score may be determined based on the relevant information, and corresponding index information may be built based on the language type and key score of the search keyword. The index information comprises first index information and second index information. The first index information is prefix index information, which refers to index information built with a prefix as an index. The second index information is segmented word index information, which refers to index information built with a segmented word as an index. The prefix refers to a constituent part in the front of a word, for example, prefixes of "word" including "w", "wo", and "wor", while the segmented word refers to a word, a phrase, and other parts obtained by semantic segmentation. These may be used as an index to create corresponding index information. The index information may be arranged invertedly according to key scores, with a threshold of the keywords as a filtering field.

On the basis of constructing index information already, a plurality of search keywords in the first language may be determined based on this index information. The search information in the first language may be employed to search in the index information, and a plurality of search keywords in the first language may be determined. Prefix recall may be executed. The performing matching based on the search information in the first language, determining a plurality of search keywords in the first language comprises: querying first index information by using the search information in the first language as a prefix, determining at least one search keyword in the first language, wherein the first index information is created by using prefixes as indexes; matching, based on the search information in the first language, historical search data, determining at least one search keyword in the first language. Using the search information in the first language as a prefix, a search keyword corresponding to this prefix is queried in the first index information, and then screening is performed using the first language as a filtering field to determine at least one search keyword in the first language. Moreover, the search information in the first language may be employed to match historical search data of this user to determine at least one search keyword in the first language. When visiting a webpage or conducting a search, the user may log into the webpage to identify the user, thereby acquiring historical search data or the like of this user.

In the embodiments of the present application, search data in some languages is less, and the search keywords in the first language matched through the prefix may be also fewer, such that other recall ways are needed for matching. An embodiment of the present application may preset a condition. If the number of matched search keywords in the first language does not meet the condition, it will continue to employ other ways for matching. If the number of matched search keywords in the first language meets the condition, matching may also be continued. On condition that the number of search keywords in the first language is less than a set threshold, search keywords in the first language corresponding to the search information are matched in other ways.

Surely, in other embodiments, an extension threshold may not be set. Instead, matching is performed directly by other recall ways, followed by screening and then sorting. The embodiments of the present application make no limitation in this regard. That is, after a plurality of search keywords in the first language are determined based on the first index information and the historical search data, search keywords in the first language corresponding to the search information are matched through other ways.

The search keywords in the first language corresponding to the search information are matched in other ways, which comprises at least one of the following.

Segmented word recall: segmenting the search information, employing a corresponding segmentation result to match second index information, determining at least one search keyword in the first language, wherein the second index information is created by using segmented words as indexes. The search information may be analyzed according to semantics, and then based on a semantic analysis, a plurality of segmented fragments may be determined as segmentation results, of which each segmented fragment may be a character, a word, a phrase or the like. Then, each segmented fragment is employed to match the second index information to determine at least one piece of search information; and then screening is performed using the first language as a filtering field to determine at least one search keyword in the first language.

Stem matching: extracting a stem of text in the search information, matching the first index information and/or the second index information based on the stem, determining at least one search keyword in the first language. Analysis is performed for the search information to extract a stem of words in the search information, wherein the stem refers to a concept relative to a suffix, which is a structural morpheme, and a part of one word that is left after the suffix is removed is the stem. For example, for a word in plural from, a part that is left after the plural suffix is removed is the stem. For example, the stem of "words" is "word", and the stem of "dresses" is "dress". Then, based on this stem, at least one of the first index information and the second index information is matched to obtain a corresponding search keyword, and then screening is performed using the first language as a filtering field to determine at least one search keyword in the first language.

Error correction recall: performing error correction detection for the search information, revising search information with an error, employing the revised search information to perform matching, determining at least one search keyword in the first language. Difficulties for some search information in matching search keywords may be caused by a spelling error. Therefore, error correction detection is performed for the search information. If an error is detected, the error location may be determined, and revision may be performed to obtain revised search information. Then, the revised search information is employed to match at least one of the first index information and the second index information to obtain a corresponding search keyword, and then screening is performed using the first language as a filtering field to determine at least one search keyword in the first language.

Semantic recall: performing semantic analysis for the search information, determining at least one search keyword in the first language which is semantically matched. Semantic analysis may also be performed for the search information to determine corresponding semantic information, and then at least one corresponding search keyword in the first language may be determined according to the semantic information.

In the embodiments of the present application, an order of the above recall ways is not limited and may be determined based on demands. Multiple keyword recall ways may be combined to expand the coverage of associative words of input from a user. In a recalling process, the prefix recall, segmented word recall, stem matching, error correction recall, semantic recall, and other ways are used according to the richness of keywords to ensure efficiency while improving the coverage of a long tail input. The long tail input refers to an input that is more qualitative, niche, personalized, and individualized. For example, a minority language input is more niche and personalized.

At Step 106, determining a plurality of search keywords in a target language respectively corresponding to the plurality of search keywords in the first language, performing sorting based on the plurality of search keywords in the target language, and screening the plurality of search keywords in the target language.

Due to less search data on some minority languages, it is difficult to screen out suitable keywords at the time of predictive search. Therefore, the embodiments of the present application may choose a language with a better data foundation in search data, click data, or the like as a target language, and perform screening on the basis of the target language. For example, English has a wide range of applications, and there are more search information and click data related to it on websites, which can provide a richer and more accurate data foundation. Therefore, English may be used as the target language. Still for example, Chinese or the like is used as the target language. Therefore, on condition that the first language is the target language, conversion is not needed. On condition that the first language is not the target language, it may be converted to the target language. The determining the plurality of search keywords in the target language respectively corresponding to the plurality of search keywords in the first language comprises: determining whether the first language is the target language; on condition that the first language is the target language, using the search keywords in the first language as the search keywords in the target language; on condition that the first language is not the target language, querying the search keywords in the target language corresponding to the search keywords in the first language. Thus, a sorting module can be constructed on the basis of the target language to sort and score the respective search keywords. A correspondence between keywords in other languages and keywords in the target language may be predetermined, a keyword conversion table is generated based on the correspondence, and the conversion table may be directly queried subsequently. For example, a Chinese word "连衣裙" corresponds to an English word "dress"; or an Azerbaijani word "paltar" corresponds to the English word "dress"; or a Croatian word "haljina" corresponds to the English word "dress". By querying the keyword conversion table, the search keywords in the target language corresponding to the search keywords in the first language may be determined.

The embodiments of the present application may use Chinese, English, or others as the target language in advance, to determine training data and train the sorting module, thereby facilitating subsequent sorting of search keywords based on use of this sorting model. The training data includes: the search keywords in the target language, historical search keyword sequences, user features, keyword features and deviation parameters or the like. The deviation parameters refer to related parameters of a deviation caused by display of a search keyword in a search result, including a display location of a search keyword, the number of times of displaying the search keyword, the number of clicks on the search keyword, or the like. These deviation parameters are used to input into the sorting model to reduce (or even eliminate) an impact of the deviation caused by the search result. In this sorting model, a target keyword and historical search keyword sequence may be analyzed first based on an attention mechanism to determine the user's score for the target keyword, which is used as a first output result. Processing is performed for the deviation parameter by employing Deep Neural Network (DNN), and the impact caused by the deviation is eliminated through a deviation network to obtain a corresponding second output result. Then, processing is performed based on the first output result, the second output result, the user features, and the keyword features to obtain a sorting score of this target keyword. Then, a loss function may be calculated based on this sorting score, and this sorting model may be adjusted based on the loss function until a sorting model that meets demands is determined, which is used in keyword sorting.

In an optional embodiment of the present application, performing sorting based on the plurality of search keywords in the target language comprises: inputting the plurality of search keywords in the target language into a sorting module, determining a sorting score corresponding to each search keyword; and sorting the search keywords in the target language according to the sorting scores. The plurality of search keywords in the target language may be input into the sorting module for processing, and the sorting score corresponding to each of the search keywords may be output respectively. Then, the search keywords in the target language may be sorted according to the sorting scores, which, for example, are sorted in a descending order, and the top N search keywords are screened out, where N is a positive integer, and a value of the N may be determined based on demands, which is, for example, 3, 5, 10, 12, 13, or the like.

The inputting the plurality of search keywords in the target language into a sorting module, determining a sorting score corresponding to each search keyword comprises: acquiring a historical search keyword sequence and feature parameters of a user, wherein the feature parameters include: user features, keyword features and deviation parameters; inputting the plurality of search keywords in the target language, the historical search keyword sequence and the feature parameters into the sorting module for processing; and outputting the sorting score corresponding to each search keyword. In inputting the plurality of search keywords in the target language, the historical search keyword sequence and the feature parameters into the sorting module for processing, the sorting module may first analyze a search keyword in the target language and the historical search keyword sequence based on an attention mechanism to determine a first output result, process the deviation parameters based on Deep Neural Network (DNN), and eliminate an impact of a deviation through a deviation network to obtain a corresponding second output result. Then, processing is performed based on the first output result, the second output result, the user features, and the keyword features to obtain a sorting score of this target keyword. Thus, the sorting score of each target keyword can be determined, and sorting can be performed based on the sorting scores.

In the embodiments of the present application, before inputting target keywords into the sorting model, the search keywords in the target language may also be screened to screen out a specified number of search keywords in the target language. Some search keywords may be screened out from those obtained in various recall ways, and search keywords may also be screened based on value scores. For example, 10 search keywords are screened out from a plurality of search keywords in the first language as matched based on historical search data, and 40 search keywords in the first language are screened out according to key scores from a plurality of search keywords in the first language as determined through other recall ways, thereby obtaining 50 search keywords in the first language, which are converted to search keywords in the target language for sorting.

At Step 108, determining search keywords, as predictive search keywords, in the first language corresponding to search keywords in the target language that have been screened out.

After sorting the search keywords in the target language according to sorting scores, top N search keywords in the target language may be screened out, then N search keywords in the first language corresponding to these N search keywords in the target language are determined, which, for example, are queried and determined based on the keyword conversion table, and they are used as predictive search keywords.

At Step 110, feeding back the predictive search keywords to perform search prompt in a search box.

The respective predictive search keywords are employed to generate prediction results, and these prediction results are fed back to a client side to give a prompt when the user inputs the search information.

In the embodiments of the present application, after seeing the prompted search keywords, the user may directly select a needed search keyword, or based on the input, in response to the user's input, the above process may be executed to continue to prompt the user with predictive search keywords.

In summary, search information in a first language is received and matched, a plurality of search keywords in the first language are determined, then a search keyword in a target language corresponding to each of the search keywords in the first language is determined, sorting is performed based on a plurality of search keywords in the target language, the search keywords in the target language are screened. Other target languages may be introduced to sort the keywords in the first language to improve the accuracy of sorting. Search keywords in the first language corresponding to the search keywords in the target language that are screened out are determined and used as predictive search keywords, and feedback on the predictive search keywords is provided to perform search prompt in a search box, such that search keywords can be matched and accurately sorted even for a language with scarce behavior, the accuracy of the keywords is improved, and the efficiency of user search and input is improved.

As search and input efficiency is improved, the accuracy of keyword matching is improved, correspondingly, the efficiency of subsequent searches can also be improved, and more accurate search results can be provided to users.

On the basis of the above embodiments, an embodiment of the present application further provides a search prompt method that can determine search keywords in a first language based on multiple recall ways, then combine with a sorting model of a target language with rich data foundations, convert the search keywords in the first language to search keywords in the target language, and then input them into the sorting model to improve the accuracy of sorting.

Figure 2:
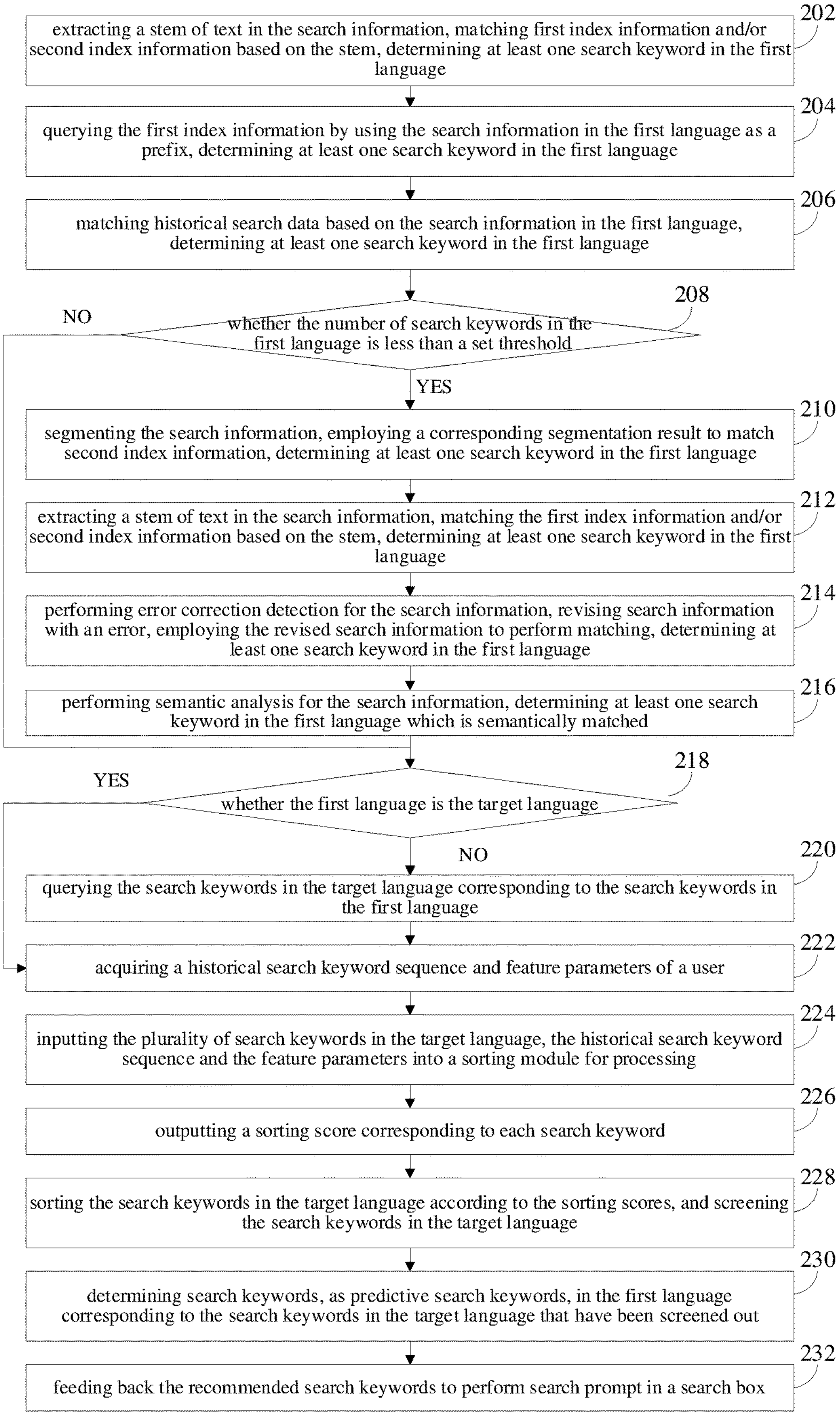
FIG. 2 is a flow chart of steps of another embodiment of the search prompt method in the present application.

Referring to FIG. 2, there is shown a flow chart of steps of another embodiment of the search prompt method in the present application.

At Step 202, receiving search information in a first language.

At Step 204, querying first index information by using the search information in the first language as a prefix, determining at least one search keyword in the first language.

At Step 206, matching, based on the search information in the first language, historical search data, determining at least one search keyword in the first language.

In the embodiments of the present application, the above two steps may also be executed at the same time, or the order of execution may be adjusted, and the embodiment of the present application makes no limitation in this regard.

At Step 208, determining whether the number of search keywords in the first language is less than a set threshold.

If so, Step 210 is executed; if not, Step 220 is executed.

At Step 210, segmenting the search information, employing a corresponding segmentation result to match second index information, determining at least one search keyword in the first language.

At Step 212, extracting a stem of text in the search information, matching the first index information and/or the second index information based on the stem, determining at least one search keyword in the first language.

At Step 214, performing error correction detection for the search information, revising search information with an error, employing the revised search information to perform matching, determining at least one search keyword in the first language.

At Step 216, performing semantic analysis for the search information, determining at least one search keyword in the first language which is semantically matched.

The order of execution of the above Steps 210 to 216 may be adjusted, or the determination at Step 208 may be executed after each step to determine whether subsequent recall processing needs to be executed. The embodiment of the present application makes no limitation in this regard.

At Step 218, determining whether the first language is the target language.

If so, that is, the first language is the target language, the search keywords in the first language are used as search keywords in the target language, and then Step 222 is executed. If not, Step 220 is executed.

At Step 220, querying search keywords in the target language corresponding to the search keywords in the first language.

At Step 222, acquiring a historical search keyword sequence and feature parameters of a user.

At Step 224, inputting the plurality of search keywords in the target language, the historical search keyword sequence and the feature parameters into a sorting module for processing.

At Step 226, outputting a sorting score corresponding to each search keyword.

At Step 228, sorting the search keywords in the target language according to the sorting scores, and screening the search keywords in the target language. For example, the search keywords in the target language are sorted according to the sorting scores, and N search keywords in the target language are screened out.

At Step 230, determining search keywords, as predictive search keywords, in the first language corresponding to search keywords in the target language that have been screened out.

At Step 232, feeding back the predictive search keywords to perform search prompt in a search box.

The embodiments of the present application may be applied to mixture matching and recalling of multilingual search keywords. A mixed index is constructed based on the corpus of multilingual search keywords, and language filtering is performed in a process of matching with search information input by a user to guarantee that the keywords recalled by an algorithm are related to user input and consistent with the language used by the user. Thus, all languages can be covered by maintaining only one index, which is simpler and more efficient than the way of building indexes for different languages, and is also more suitable in a case of scarce multilingual data.

On the basis of the above embodiments, an embodiment of the present application further provides a search prompt method, in which a user accesses a website through an application (APP), a browser in a terminal device or other client sides, and a server side provides transaction services on cross-border commodity objects.

Figure 3:
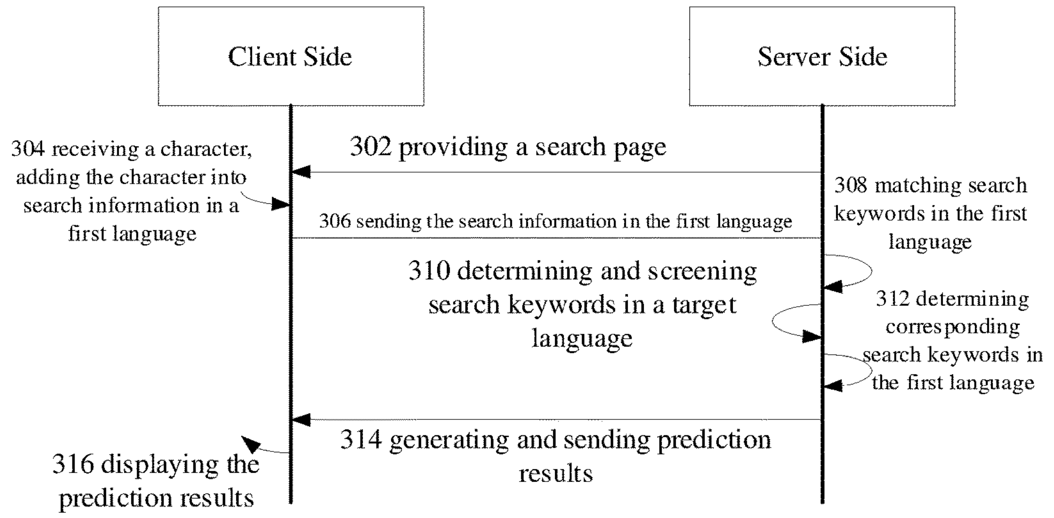
FIG. 3 is a flow chart of steps of an embodiment of a search prompt method in the present application.

Referring to FIG. 3, there is shown an interactive schematic diagram of an example of a search prompt method in an embodiment of the present application.

At Step 302, providing, by a server side, a search page.

This search page is various pages that provide search services, such as a homepage of an e-commerce website, a commodity object details page, or the like. The search page comprises search controls such as a search box, which can provide search services.

At Step 304, in response to triggering the search control, receiving, by a client side, a character input by a user, and adding the character into search information in a first language, wherein the search information in the first language comprises at least one character.

The user may trigger the search control and input characters in the search control. Every time one character is input, it is added to the search information, and the search information is sent. Until the user determines a search keyword to search, search information is sent every time one character is input. Since the user inputs characters one by one in an inputting process, the way of sending and predicting the character after each input can prompt the user by predicting search keywords after each input. If there is any search keyword needed by the user among predictive search keywords, the user may directly select this search keyword to search and quickly acquire needed commodity objects or other information.

Figure 4:
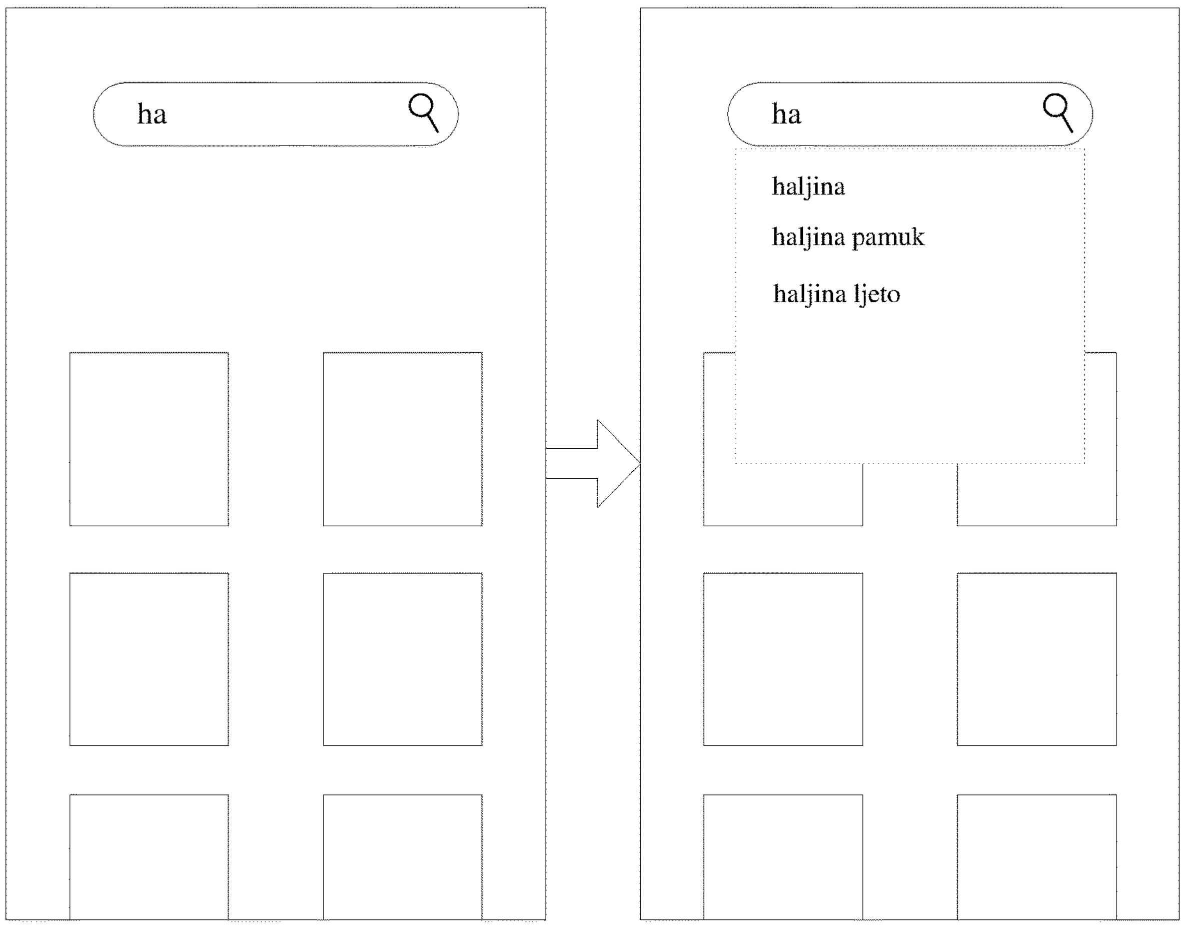
FIG. 4 is a schematic diagram of an example of a search prompt page in an embodiment of the present application.

In the example shown in FIG. 4, the first language is Croatian, and the user inputs "h", in response to triggering the search control, corresponding search information in the first language is acquired, i.e., "h". The user continues to input "a", in response to triggering the search control, corresponding search information in the first language is acquired, i.e., "ha".

At Step 306, sending, by the client side, the search information in the first language to the server side.

At Step 308, performing matching, by the server side, based on the search information in the first language, determining a plurality of search keywords in the first language.

The performing matching based on the search information in the first language, determining a plurality of search keywords in the first language comprises: querying first index information by using the search information in the first language as a prefix, determining at least one search keyword in the first language, wherein the first index information is created by using prefixes as indexes; matching, based on the search information in the first language, historical search data, determining at least one search keyword in the first language.

On condition that the number of search keywords in the first language is less than a set threshold, the search keywords in the first language corresponding to the search information are matched in other ways.

Optionally, the search keywords in the first language corresponding to the search information are matched in other ways, which comprises at least one of the following: segmenting the search information, employing a corresponding segmentation result to match second index information, determining at least one search keyword in the first language, wherein the second index information is created by using segmented words as indexes; extracting a stem of text in the search information, matching the first index information and/or the second index information based on the stem, determining at least one search keyword in the first language; performing error correction detection for the search information, revising search information with an error, employing the revised search information to perform matching, determining at least one search keyword in the first language; and performing semantic analysis for the search information, determining at least one search keyword in the first language which is semantically matched.

In the above example, search keywords such as "Haljina", "Haljina ljeto", and "Haljina pamuk" in Croatian may be retrieved.

At Step 310, determining, by the server side, a plurality of search keywords in a target language respectively corresponding to the plurality of search keywords in the first language, performing sorting based on the plurality of search keywords in the target language, and screening the plurality of search keywords in the target language.

The determining the plurality of search keywords in the target language respectively corresponding to the plurality of search keywords in the first language comprises: determining whether the first language is the target language; on condition that the first language is the target language, using the search keywords in the first language as the search keywords in the target language; on condition that the first language is not the target language, querying the search keywords in the target language corresponding to the search keywords in the first language. For example, if English is used as the target language, the Croatian search keywords “Haljina”, “Haljina ljeto” and “Haljina pamuk” in the above example may correspond to the English search keywords “dress”, “dress summer” and “dress cotton” respectively.

The performing sorting based on the plurality of search keywords in the target language comprises: inputting the plurality of search keywords in the target language into a sorting module, determining a sorting score corresponding to each search keyword; and sorting the search keywords in the target language according to the sorting scores.

The inputting the plurality of search keywords in the target language into a sorting module, determining a sorting score corresponding to each search keyword comprises: acquiring a historical search keyword sequence and feature parameters of a user, wherein the feature parameters include: user features, keyword features and deviation parameters; inputting the plurality of search keywords in the target language, the historical search keyword sequence and the feature parameters into the sorting module for processing; and outputting the sorting score corresponding to each search keyword.

At Step 312, determining, by the server side, search keywords in the first language corresponding to the search keywords in the target language that are screened out, and using the determined search keyword in the first language as predictive search keywords.

At Step 314, generating, by the server side, prediction results based on the predictive search keywords, and feeding back the prediction results to the client side.

As in the above example, the search keywords “dress”, “dress cotton” and “dress summer” in the target language may be screened out through sorting, which correspond to the Croatian search keywords “Haljina”, “Haljina pamuk” and “Haljina ljeto”, and prediction results are generated and fed back to the client side, which are displayed as the page on the right side in FIG. 4.

At Step 316, displaying, by the client side, the prediction results.

Thus, in a process of the user’s inputting, predictive information may be matched and displayed based on an input of the user, thereby giving a prompt to the user. The user may select a needed keyword. If there is no needed keyword, input may also continue for matching and predicting again.

On the basis of the above embodiments, an embodiment of the present application further provides a search prompt method.

Figure 5:
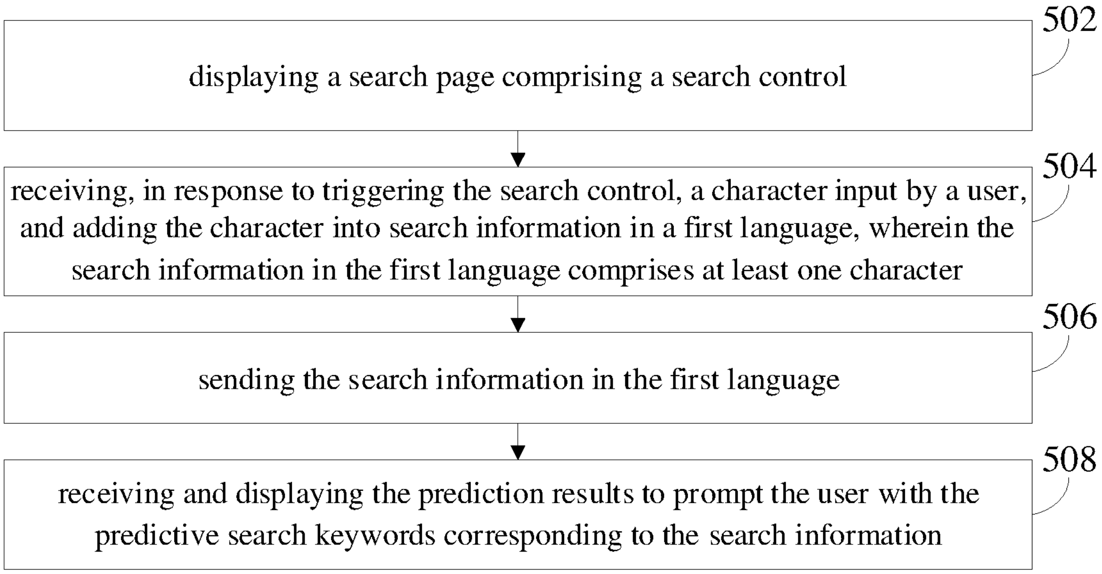
FIG. 5 is a flow chart of steps of an embodiment of a search prompt method at a client side in the present application.

Referring to FIG. 5, there is shown a flow chart of steps of an embodiment of a search prompt method at a client side in the present application.

At Step 502, displaying a search page, wherein the search page comprises a search control.

At Step 504, receiving, in response to triggering the search control, a character input by a user, and adding the character into search information in a first language, wherein the search information in the first language comprises at least one character.

At Step 506, sending the search information in the first language.

Matching is performed at a server side based on the search information in the first language, a plurality of search keywords in the first language are determined, a plurality of search keywords in a target language respectively corresponding to the plurality of the search keywords in the first language are determined, sorting is performed based on the plurality of search keywords in the target language, the search keywords in the target language are screened. Search keywords in the first language corresponding to the search keywords in the target language that are screened out are determined and used as predictive search keywords, and prediction results are generated.

At Step 508, receiving and displaying the prediction results to prompt the user with the predictive search keywords corresponding to the search information.

In some scenarios, search information that the user needs may not be included in the prediction results. Therefore, the user may trigger Step 504 based on input characters, so as to add the characters as received into the search information in the first language and send the same, and perform matching for search information composed of the characters input this time and the characters input previously to determine predictive search keywords.

In other scenarios, the method further comprises: determining, in response to a selection instruction, a selected search keyword; and generating a search request based on the search keyword, and sending the search request to perform search prompt. The user may select a needed keyword, and a search request is generated based on the selected search keyword and sent to the server side. The server side may query based on the search keyword in the search request and provide feedback on a corresponding search result.

Figure 6:
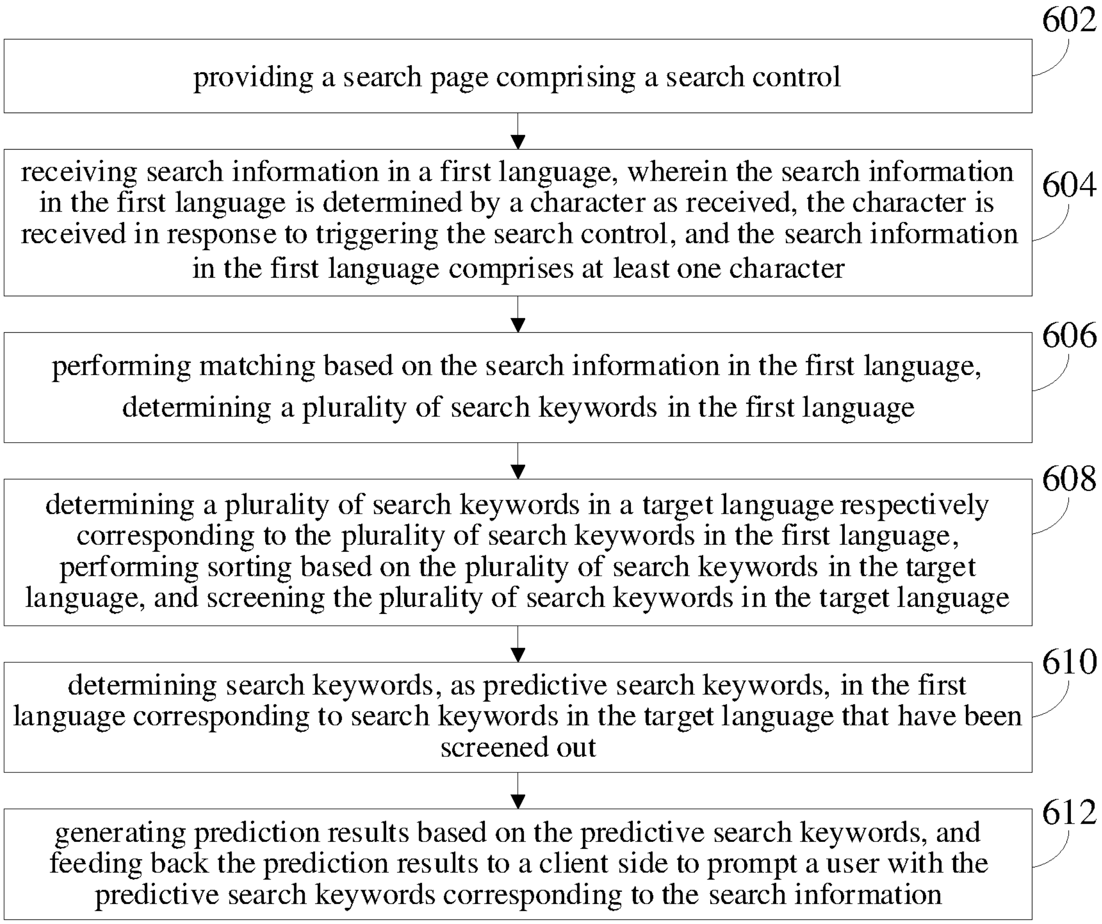
FIG. 6 is a flow chart of steps of an embodiment of a search prompt method at a server side in the present application.

Referring to FIG. 6, there is shown a flow chart of steps of an embodiment of a search prompt method at a server side in the present application.

At Step 602, providing a search page, wherein the search page comprises a search control.

At Step 604, receiving search information in a first language, wherein the search information in the first language is determined by a character as received, the character is received in response to triggering the search control, and the search information in the first language comprises at least one character.

At Step 606, performing matching based on the search information in the first language, determining a plurality of search keywords in the first language.

The performing matching based on the search information in the first language, determining a plurality of search keywords in the first language comprises: querying first index information by using the search information in the first language as a prefix, determining at least one search keyword in the first language, wherein the first index information is created by using prefixes as indexes; matching, based on the search information in the first language, historical search data, determining at least one search keyword in the first language.

The method further comprises: matching the search keywords in the first language corresponding to the search information in other ways on condition othat the number of search keywords in the first language is less than a set threshold.

In an optional embodiment, the matching the search keywords in the first language corresponding to the search information in other ways comprises at least one of the following: segmenting the search information, employing a corresponding segmentation result to match second index information, determining at least one search keyword in the first language, wherein the second index information is created by using segmented words as indexes; extracting a stem of text in the search information, matching the first index information and/or the second index information based on the stem, determining at least one search keyword in the first language; performing error correction detection for the search information, revising search information with an error, employing the revised search information to perform matching, determining at least one search keyword in the first language; and performing semantic analysis for the search information, determining at least one search keyword in the first language which is semantically matched.

At Step 608, determining a plurality of search keywords in a target language respectively corresponding to the plurality of search keywords in the first language, performing sorting based on the plurality of search keywords in the target language, and screening the plurality of search keywords in the target language.

The determining the plurality of search keywords in the target language respectively corresponding to the plurality of search keywords in the first language comprises: determining whether the first language is the target language; on condition that the first language is the target language, using the search keywords in the first language as the search keywords in the target language; on condition that the first language is not the target language, querying the search keywords in the target language corresponding to the search keywords in the first language.

The performing sorting based on the plurality of search keywords in the target language comprises: inputting the plurality of search keywords in the target language into a sorting module, determining a sorting score corresponding to each search keyword; and sorting the search keywords in the target language according to the sorting scores.

Optionally, the inputting the plurality of search keywords in the target language into a sorting module, determining a sorting score corresponding to each search keyword comprises: acquiring a historical search keyword sequence and feature parameters of a user, wherein the feature parameters include: user features, keyword features and deviation parameters; inputting the plurality of search keywords in the target language, the historical search keyword sequence and the feature parameters into the sorting module for processing; and outputting the sorting score corresponding to each search keyword.

At Step 610, determining search keywords, as predictive search keywords, in the first language corresponding to search keywords in the target language that have been screened out.

At Step 612, generating prediction results based on the predictive search keywords, and feeding back the prediction results to a client side to prompt a user with the predictive search keywords corresponding to the search information.

Compared with a way of separately building an index for each language, which incurs high data maintenance costs, the embodiments of the present application employ a mixed index constructed with multilingual search keywords. When matching with the search information input by the user, filtering is performed according to languages, guaranteeing that the matched search keywords are related to the search information and belong to the same language. Thus, only the mixed index covering various languages needs to be maintained, which is simpler and more efficient, and is also more suitable in a case of scarce multilingual data.

The embodiments of the present application combine multiple keyword recalling ways, such as prefix recall, segmented word recall, stem matching, error correction recall and semantic recall, to expand the coverage of long-tail input while ensuring efficiency. Compared with a way of generating a model to obtain candidate keywords, it is more efficient and more accurate. Compared with a way of clustering keywords to build a query tree, it can cover more long-tail user inputs, and is safer and easy to maintain.

The embodiments of the present application can support prediction and recommendation on the user's personalized keywords. In recall and rough sorting stages of a search, the search keywords that the user has searched in the past may be recalled separately and prioritized for fine sorting, that is, being preferentially input into the sorting model for processing. In the sorting model, analysis may be performed based on user historical search data and keywords and based on an attention mechanism, making learning more sufficient and results more accurate, and recommending keywords in conformity with the user's interests.

It should be noted that the embodiments of the present application may involve usage of user data. In practical applications, particular personal data of a user may be used in the solutions described herein to the extent permitted by applicable laws and regulations of the country involved, provided that the requirements of the applicable laws and regulations are met (e.g., the user has given an explicit consent, the user has been duly notified, etc.).

It should be noted that for the sake of simple description, the method embodiments are expressed as combinations of a series of actions. However, those skilled in the art should know that the embodiments of the present application are not limited by the described action orders, because according to the embodiments of the present application, certain steps may be performed in other orders or at the same time. Second, those skilled in the art should also know that the embodiments described in the specification are all preferred embodiments, and the actions involved are not definitely necessary for the embodiments of the present application.

On the basis of the above embodiments, an embodiment of the present application further provides a search prompt apparatus, applied in a server-side device or other electronic devices, and comprising:

- a receiving module, used for receiving search information in a first language;
- a search module, used for performing matching based on the search information in the first language, determining a plurality of search keywords in the first language;
- a sorting module, used for determining a plurality of search keywords in a target language respectively corresponding to the plurality of search keywords in the first language, performing sorting based on the plurality of search keywords in the target language, and screening the plurality of search keywords in the target language; determining search keywords, as predictive search keywords, in the first language corresponding to search keywords in the target language that have been screened out; and
- a feedback module, used for feeding back the predictive search keywords to perform search prompt in a search box.

In summary, search information in a first language is received and matched, a plurality of search keywords in the first language are determined, then a plurality of search keywords in a target language respectively corresponding to the plurality of the search keywords in the first language are determined, sorting is performed based on the plurality of search keywords in the target language, the search keywords in the target language are screened. Other target languages may be introduced to sort the keywords in the first language to improve the accuracy of sorting. Search keywords in the first language corresponding to the search keywords in the target language that are screened out are determined and used as predictive search keywords, and feedback on the predictive search keywords is provided to perform search prompt in a search box, such that search keywords can be matched and accurately sorted even for a language with scarce behavior, the accuracy of the keywords is improved, and the efficiency of user search and input is improved.

The search module comprises: a prefix matching unit, a history matching unit, a segmented word matching unit, a stem matching unit, an error correction matching unit and a semantic matching unit.

The prefix matching unit is used for querying first index information by using the search information in the first language as a prefix, determining at least one search keyword in the first language, wherein the first index information is created by using prefixes as indexes.

The history matching unit is used for matching, based on the search information in the first language, historical search data, determining at least one search keyword in the first language.

The search module is further used for matching the search keywords in the first language corresponding to the search information in other ways on condition that the number of search keywords in the first language is less than a set threshold.

The segmented word matching unit is used for segmenting the search information, employing a corresponding segmentation result to match second index information, determining at least one search keyword in the first language, wherein the second index information is created by using segmented words as indexes.

The stem matching unit is used for extracting a stem of text in the search information, matching the first index information and/or the second index information based on the stem, determining at least one search keyword in the first language.

The error correction matching unit is used for performing error correction detection for the search information, revising search information with an error, employing the revised search information to perform matching, determining at least one search keyword in the first language.

The semantic matching unit is used for performing semantic analysis for the search information, determining at least one search keyword in the first language which is semantically matched.

The sorting module comprises: a language conversion unit and a sorting scoring unit.

The language conversion unit is used for determining whether the first language is the target language; on condition that the first language is the target language, using the search keywords in the first language as the search keywords in the target language; on condition that the first language is not the target language, querying the search keywords in the target language corresponding to the search keywords in the first language.

The sorting scoring unit is used for inputting the plurality of search keywords in the target language into a sorting module, determining a sorting score corresponding to each search keyword; and sorting the search keywords in the target language according to the sorting scores.

The sorting scoring unit is used for acquiring a historical search keyword sequence and feature parameters of a user, wherein the feature parameters include: user features, keyword features and deviation parameters; inputting the plurality of search keywords in the target language, the historical search keyword sequence and the feature parameters into the sorting module for processing; and outputting the sorting score corresponding to each search keyword.

On the basis of the above embodiments, an embodiment of the present application further provides a search prompt apparatus, applied in a client side device or other electronic devices, and comprising:

a display module, used for displaying a search page, wherein the search page comprises a search control; and displaying prediction results to prompt a user with search keywords;

an input acquisition module, used for acquiring, in response to triggering the search control, corresponding search information in a first language;

a sending module, used for sending the search information in the first language to perform matching, at a server side, based on the search information in the first language, determining a plurality of search keywords in the first language; determining a plurality of search keywords in a target language respectively corresponding to the plurality of search keywords in the first language, performing sorting based on the plurality of search keywords in the target language, screening the plurality of search keywords in the target language, determining search keywords, as predictive search keywords, in the first language corresponding to search keywords in the target language that have been screened out, and generating prediction results; and a receiving module, used for receiving the prediction results.

Corresponding to the above embodiment, a server-side search prompt apparatus comprises:

a page providing module, used for providing a search page, wherein the search page comprises a search control;

a receiving module, used for receiving search information in a first language;

a search module, used for performing matching based on the search information in the first language, determining a plurality of search keywords in the first language;

a sorting module, used for determining a plurality of search keywords in a target language respectively corresponding to the plurality of search keywords in the first language, performing sorting based on the plurality of search keywords in the target language, and screening the plurality of search keywords in the target language; and determining search keywords, as predictive search keywords, in the first language corresponding to search keywords in the target language that have been screened out; and a feedback module, used for generating prediction results based on the predictive search keywords, and feeding back the prediction results to the client side to prompt a user with the search keywords.

Compared with a way of separately building an index for each language, which incurs high data maintenance costs, the embodiments of the present application employ a mixed index constructed with multilingual search keywords. When matching with the search information input by the user, filtering is performed according to languages, guaranteeing that the matched search keywords are related to the search information and belong to the same language. Thus, only the mixed index covering various languages needs to be maintained, which is simpler and more efficient, and is also more suitable in a case of scarce multilingual data.

The embodiments of the present application combine multiple keyword recalling ways, such as prefix recall, segmented word recall, stem matching, error correction recall and semantic recall, to expand the coverage of long-tail input while ensuring efficiency. Compared with a way of generating a model to obtain candidate keywords, it is more efficient and more accurate. Compared with a way of clustering keywords to build a query tree, it can cover more long-tail user inputs, and is safer and easy to maintain.

The embodiments of the present application can support prediction and recommendation on the user's personalized keywords. In recall and rough sorting stages of a search, the search keywords that the user has searched in the past may be recalled separately and prioritized for fine sorting, that is, being preferentially input into the sorting model for processing. In the sorting model, analysis can be performed based on user historical search data and keywords and based on an attention mechanism, making learning more sufficient and results more accurate, and recommending keywords in conformity with the user's interests.

An embodiment of the present application further provides a non-volatile readable storage medium storing one or more programs that, when applied in a device, may cause this device to execute instructions for various method steps in the embodiments of the present application.

An embodiment of the present application provides one or more machine-readable media with instructions stored therein that, when executed by one or more processors, cause an electronic device to execute the method described in one or more of the above embodiments. In the embodiments of the present application, the electronic device includes a server, a terminal device or other devices.

Figure 7:
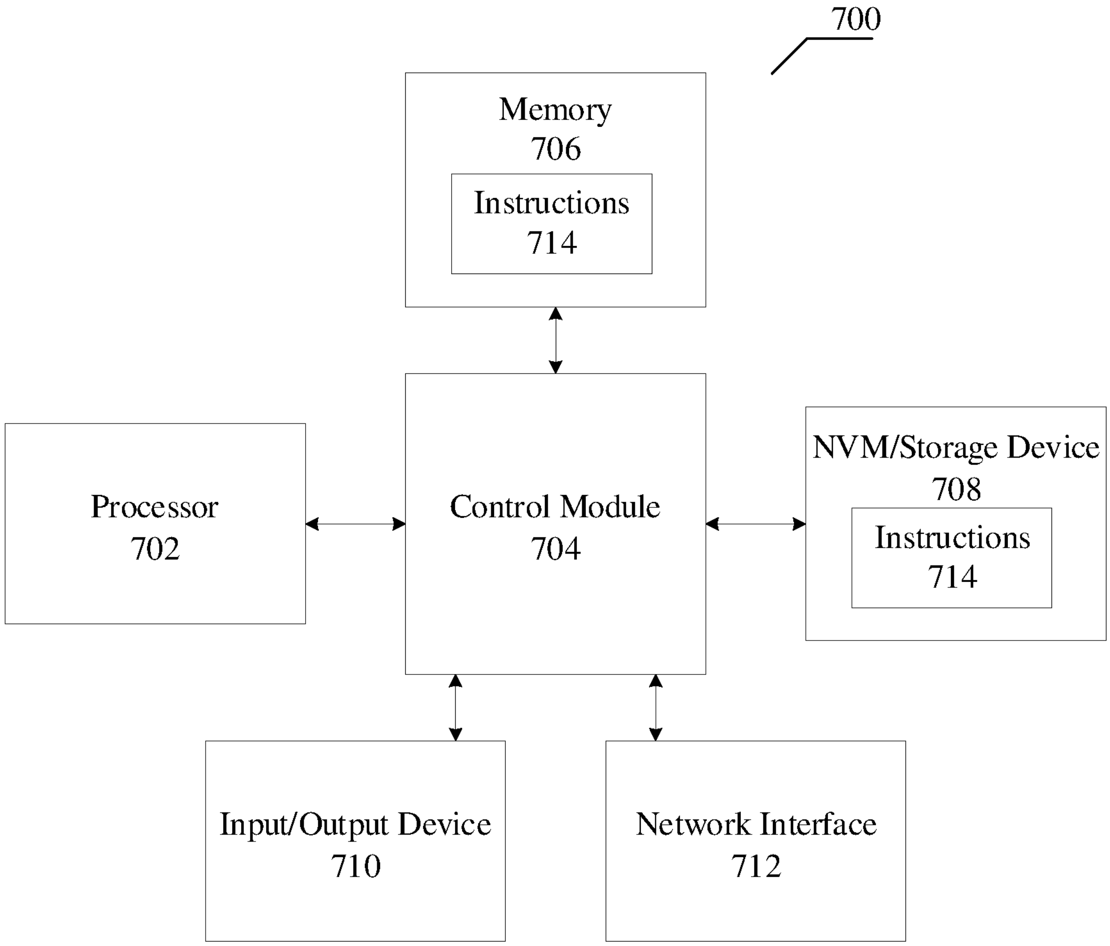
FIG. 7 is a schematic structural diagram of an exemplary apparatus provided in an embodiment of the present application.

The embodiments of the present disclosure may be implemented as an apparatus using any appropriate hardware, firmware, software or any combination thereof to perform desired configurations, and the apparatus may include a server (cluster), a terminal or other electronic devices. FIG. 7 schematically illustrates an exemplary apparatus 700 that may be used to implement various embodiments described in the present application.

For an embodiment, FIG. 7 illustrates an exemplary apparatus 700 having one or more processors 702, a control module (a chipset) 704 coupled to at least one of (one or more) processors 702, a memory 706 coupled to control module 704, a non-volatile memory (NVM)/storage device 708 coupled to control module 704, one or more input/output devices 710 coupled to control module 704, and a network interface 712 coupled to control module 704.

Processor 702 may comprise one or more single-core or multi-core processors, and processor 702 may comprise any combination of general-purpose processors or dedicated processors (e.g., a graphics processor, an application processor, a baseband processor, etc.). In some embodiments, apparatus 700 can serve as the server side, terminal or other devices described in the embodiments of the present application.

In some embodiments, apparatus 700 may comprise one or more computer-readable media (e.g., memory 706 or NVM/storage device 708) having instructions 714 and one or more processors 702 configured to execute instructions 714 in conjunction with the one or more computer-readable media to implement modules, thereby executing the actions described in the present disclosure.

For an embodiment, control module 704 may comprise any appropriate interface controller to provide any appropriate interface for at least one of (one or more) processors 702 and/or any appropriate device or component in communication with control module 704.

Control module 704 may comprise a memory controller module to provide an interface for memory 706. The memory controller module may be a hardware module, a software module and/or a firmware module.

Memory 706 may be used, for example, to load and store data and/or instructions 714 for apparatus 700. For an embodiment, memory 706 may comprise any appropriate volatile memory, such as an appropriate DRAM. In some embodiments, memory 706 may comprise a double data rate 4 synchronous dynamic random-access memory (DDR4SDRAM).

For an embodiment, control module 704 may comprise one or more input/output controllers to provide interfaces to NVM/storage device 708 and (one or more) input/output devices 710.

For example, NVM/storage device 708 may be used to store data and/or instructions 714. NVM/storage device 708 may comprise any appropriate non-volatile memory (e.g., flash memory) and/or may comprise any appropriate (one or more) non-volatile storage devices (e.g., one or more hard disk drives (HDD), one or more compact disc (CD) drives and/or one or more digital versatile disc (DVD) drives).

NVM/storage device 708 may comprise storage resources as part of a device on which apparatus 700 is installed, or may be accessed by this device without necessarily being part of the device. For example, NVM/storage device 708 may be accessed over the network via (one or more) input/output devices 710.

(One or more) input/output devices 710 may provide an interface for apparatus 700 to communicate with any other appropriate device, and may comprise a communication component, an audio component, a sensor component and the like. Network interface 712 may provide an interface for apparatus 700 to communicate over one or more networks, and apparatus 700 may wirelessly communicate with one or more components in a wireless network according to any standard and/or protocol of one or more wireless network standards and/or protocols, which, for example, accesses a wireless network based on communication standards, such as Bluetooth, WiFi, 2G, 3G, 4G, 5G, etc., or their combination for wireless communication.

For an embodiment, at least one of (one or more) processors 702 may be packaged together with logics of one or more controllers (e.g., a memory controller module) of control module 704. For an embodiment, at least one of (one or more) processors 702 may be packaged together with logics of one or more controllers of control module 704 to form a system in package (SiP). For an embodiment, at least one of (one or more) processors 702 may be integrated on the same model with logics of one or more controllers of control module 704. For an embodiment, at least one of (one or more) processors 702 may be integrated on the same model with logics of one or more controllers of control module 704 to form a system on chip (SoC).

In various embodiments, apparatus 700 may be, but is not limited to, a terminal device such as a server, a desktop computing device or a mobile computing device (e.g., a laptop computing device, a handheld computing device, a tablet computer, a netbook, etc.). In various embodiments, apparatus 700 may have more or fewer components and/or a different architecture. For example, in some embodiments, apparatus 700 comprises one or more cameras, a keyboard, a liquid crystal display (LCD) screen (including a touch screen display), a non-volatile memory port, a plurality of antennas, a graphics chip, an application specific integrated circuit (ASIC) and a speaker.

A main control chip may be employed as a processor or control module in a detection device, sensor data, location information or the like are stored in the memory or NVM/ storage device, a sensor group may be used as an input/output device, and a communication interface may comprise a network interface.

An embodiment of the present application further provides an electronic device, comprising: a processor; and a memory with executable codes stored therein, the executable codes, when executed by the processor, causing the processor to execute the method described in one or more embodiments of the present application. In the embodiments of the present application, various data may be stored in the memory, such as target files, file and application relevance data or other data, and may further comprise user behavior data, etc., thereby providing a data foundation for various processes.

An embodiment of the present application further provides one or more machine-readable media with executable codes stored therein, the executable codes, when executed, cause a processor to execute the method described in one or more of the embodiments of the present application.

For the device embodiments, due to their basic similarities to the method embodiments, they are described in a relatively simple manner. For related details, please refer to some description of the method embodiments.

Each embodiment in this specification is described in a progressive manner. In each embodiment, main points explained are its differences from other embodiments. The same and similar parts between various embodiments may be referred to each other.

The embodiments of the present application are described with reference to flow charts and/or block diagrams of methods, terminal devices (systems), and computer program products according to the embodiments of the present application. It should be understood that each process and/or block in the flow charts and/or block diagrams, and combinations of processes and/or blocks in the flow charts and/or block diagrams, may be implemented by computer program instructions. These computer program instructions may be provided to a processor of a general-purpose computer, a special purpose computer, an embedded processing machine, or other programmable data processing terminal device to produce one machine, such that the instructions executed by the processor of the computer or other programmable data processing terminal device produce an apparatus for implementing functions specified in one or more processes in a flow chart and/or one or more blocks in a block diagram.

These computer program instructions may also be stored in a computer-readable memory that can direct a computer or other programmable data processing terminal device to work in a particular manner, such that the instructions stored in this computer-readable memory produce an article of manufacture comprising an instruction apparatus, and this instruction apparatus implements functions specified in one or more processes in a flow chart and/or in one or more blocks in a block diagram.

These computer program instructions may also be loaded onto a computer or other programmable data processing terminal device, such that a series of operating steps are performed on the computer or other programmable terminal device to produce computer-implemented processing, thereby making the instructions executed on the computer or other programmable terminal device provide steps for implementing functions specified in one or more processes in a flow chart and/or one or more blocks in a block diagram.

Although preferred embodiments of the embodiments of the present application have been described, those skilled in the art may conduct additional changes and modifications to these embodiments once the basic inventive concepts are understood. Therefore, the appended claims are intended to be construed to include the preferred embodiments and all changes and modifications that fall within the scope of the embodiments of the present application.

Finally, it should be noted that relational terms herein such as first and second are merely used to distinguish one entity or operation from another entity or operation, and do not definitely require or imply that any such actual relation or order exists between these entities or operations. Furthermore, terms "comprise", "include" or any other variants thereof are intended to cover a non-exclusive inclusion, such that a process, method, article, or terminal device comprising a series of elements not only comprises these elements, but also comprises other elements not expressly listed, or elements inherent to such process, method, article or terminal device. Without further limitation, an element defined by the statement "comprising a . . . " does not exclude the presence of additional identical elements in a process, method, article or terminal device that comprises the indicated element.

A search prompt method, an electronic device and a storage medium provided in the present application have been introduced above in detail. Specific instances are used herein to expound the principles and implementations of the present application. The explanations of the above embodiments are merely used to help understand the methods and core ideas of the present application. Meanwhile, for those of ordinary skills in the art, there will be changes in specific implementations and application scopes pursuant to the ideas of the present application. In summary, the content of this specification should not be construed as a limitation of the present application.

What is claimed is:

1. A search prompt method, comprising:

receiving search information in a first language;

performing matching based on the search information in the first language, determining a plurality of search keywords in the first language;

determining a plurality of search keywords in a target language respectively corresponding to the plurality of search keywords in the first language, performing sorting based on the plurality of search keywords in the target language, and screening the sorted plurality of search keywords in the target language;

determining search keywords, as predictive search keywords, in the first language corresponding to search keywords in the target language that have been screened out; and feeding back the predictive search keywords in the first language to perform search prompt in a search box;

wherein the method further comprises:

on condition that a number of the search keywords in the first language is less than a set threshold, matching the search keywords in the first language corresponding to the search information in other ways, matching the search keywords comprising at least one of:

i) segmenting the search information, employing a corresponding segmentation result to match second index information, and determining at least one search keyword in the first language, wherein the second index information is created by using segmented words as indexes;

ii) extracting a stem of text in the search information, matching, based on the stem, first index information and/or the second index information, and determining at least one search keyword in the first language;

iii) performing error correction detection for the search information, revising search information with an error, employing the revised search information to perform matching, and determining at least one search keyword in the first language; or iv) performing semantic analysis for the search information, and determining at least one search keyword in the first language that is semantically matched.

2. The method according to claim 1, wherein the performing matching based on the search information in the first language, determining the plurality of search keywords in the first language comprises:

querying first index information by using the search information in the first language as a prefix, determining at least one search keyword in the first language, wherein the first index information is created by using prefixes as indexes; and matching, based on the search information in the first language, historical search data, determining at least one search keyword in the first language.

3. The method according to claim 1, wherein the determining the plurality of search keywords in the target language respectively corresponding to the plurality of search keywords in the first language comprises:

determining whether the first language is the target language;

on condition that the first language is the target language, using the search keywords in the first language as the search keywords in the target language; and on condition that the first language is not the target language, querying the search keywords in the target language corresponding to the search keywords in the first language.

4. The method according to claim 1, wherein the performing sorting based on the plurality of search keywords in the target language comprises:

inputting the plurality of search keywords in the target language into a sorting module, determining a sorting score corresponding to each search keyword; and sorting the search keywords in the target language according to the sorting scores.

5. The method according to claim 4, wherein the inputting the plurality of search keywords in the target language into the sorting module, determining the sorting score corresponding to each search keyword comprises:

acquiring a historical search keyword sequence and feature parameters of a user, wherein the feature parameters comprise: user features, keyword features and deviation parameters;

inputting the plurality of search keywords in the target language, the historical search keyword sequence and the feature parameters into the sorting module for processing; and outputting the sorting score corresponding to each search keyword.

6. A non-transitory machine-readable medium with executable codes stored therein, wherein the executable codes, when executed by a processor, execute the method according to claim 1.

7. A search prompt method, comprising:

displaying a search page, wherein the search page comprises a search control;

receiving, in response to triggering the search control, a character input by a user, and adding the character into search information in a first language, wherein the search information in the first language comprises at least one character;

sending the search information in the first language to perform matching, at a server side, based on the search information in the first language, determining a plurality of search keywords in the first language; determining a plurality of search keywords in a target language respectively corresponding to the plurality of search keyword in the first language; performing sorting based on the plurality of search keywords in the target language; screening the sorted plurality of search keywords in the target language; determining search keywords, as predictive search keywords, in the first language corresponding to search keywords in the target language that have been screened out; and generating prediction results; and receiving and displaying the prediction results to prompt the user with the predictive search keywords in the first language corresponding to the search information;

wherein the method further comprises:

on condition that a number of the search keywords in the first language is less than a set threshold, matching the search keywords in the first language corresponding to the search information in other ways, matching the search keywords comprising at least one of:

i) segmenting the search information, employing a corresponding segmentation result to match second index information, and determining at least one search keyword in the first language, wherein the second index information is created by using segmented words as indexes;

ii) extracting a stem of text in the search information, matching, based on the stem, first index information and/or the second index information, and determining at least one search keyword in the first language;

iii) performing error correction detection for the search information, revising search information with an error, employing the revised search information to perform matching, and determining at least one search keyword in the first language; or iv) performing semantic analysis for the search information, and determining at least one search keyword in the first language that is semantically matched.

8. The method according to claim 7, wherein the performing matching, at the server side, based on the search information in the first language, determining the plurality of search keywords in the first language comprises:

querying first index information by using the search information in the first language as a prefix, determining at least one search keyword in the first language, wherein the first index information is created by using prefixes as indexes; and matching, based on the search information in the first language, historical search data, determining at least one search keyword in the first language.

9. A search prompt method, comprising:

providing a search page, wherein the search page comprises a search control;

receiving search information in a first language, wherein the search information in the first language is determined by a character as received, the character is received in response to triggering the search control, and the search information in the first language comprises at least one character;

performing matching based on the search information in the first language, determining a plurality of search keywords in the first language;

determining a plurality of search keywords in a target language respectively corresponding to the plurality of search keywords in the first language, performing sorting based on the plurality of search keywords in the target language, and screening the sorted plurality of search keywords in the target language;

determining search keywords, as predictive search keywords, in the first language corresponding to search keywords in the target language that have been screened out; and generating prediction results based on the predictive search keywords in the first language, and feeding back the prediction results to a client side to prompt a user with the predictive search keywords corresponding to the search information;

wherein the method further comprises:

on condition that a number of the search keywords in the first language is less than a set threshold, matching the search keywords in the first language corresponding to the search information in other ways, matching the search keywords comprising at least one of i) segmenting the search information, employing a corresponding segmentation result to match second index information, and determining at least one search keyword in the first language, wherein the second index information is created by using segmented words as indexes;

ii) extracting a stem of text in the search information, matching, based on the stem, first index information and/or the second index information, and determining at least one search keyword in the first language;

iii) performing error correction detection for the search information, revising search information with an error, employing the revised search information to perform matching, and determining at least one search keyword in the first language; or iv) performing semantic analysis for the search information, and determining at least one search keyword in the first language that is semantically matched.

10. The method according to claim 9, wherein the performing matching based on the search information in the first language, determining the plurality of search keywords in the first language comprises:

querying first index information by using the search information in the first language as a prefix, determining at least one search keyword in the first language, wherein the first index information is created by using prefixes as indexes; and matching, based on the search information in the first language, historical search data, determining at least one search keyword in the first language.

11. The method according to claim 9, wherein the determining the plurality of search keywords in the target language respectively corresponding to the plurality of search keywords in the first language comprises:

determining whether the first language is the target language;

on condition that the first language is the target language, using the search keywords in the first language as the search keywords in the target language; and on condition that the first language is not the target language, querying the search keywords in the target language corresponding to the search keywords in the first language.

12. The method according to claim 9, wherein the performing sorting based on the plurality of search keywords in the target language comprises:

inputting the plurality of search keywords in the target language into a sorting module, determining a sorting score corresponding to each search keyword; and sorting the search keywords in the target language according to the sorting scores.

13. The method according to claim 12, wherein the inputting the plurality of search keywords in the target language into the sorting module, determining the sorting score corresponding to each search keyword comprises:

acquiring a historical search keyword sequence and feature parameters of a user, wherein the feature parameters comprise: user features, keyword features and deviation parameters;

inputting the plurality of search keywords in the target language, the historical search keyword sequence and the feature parameters into the sorting module for processing; and outputting the sorting score corresponding to each search keyword.

14. An electronic device, comprising:

a processor; and a memory with executable codes stored therein, wherein the executable codes, when executed by the processor, execute the method according to claim 1.

* * * * *